(12) United States Patent
Brück

(10) Patent No.: US 9,784,161 B2
(45) Date of Patent: Oct. 10, 2017

(54) EXHAUST GAS PURIFICATION SYSTEM FOR DIESEL ENGINES OF UTILITY MOTOR VEHICLES

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 1465 days.

(21) Appl. No.: 13/017,058

(22) Filed: Jan. 31, 2011

(65) Prior Publication Data
US 2011/0162358 A1 Jul. 7, 2011

Related U.S. Application Data

(63) Continuation of application No. PCT/EP2009/058071, filed on Jun. 26, 2009.

(30) Foreign Application Priority Data

Jul. 30, 2008 (DE) .................. 10 2008 035 562

(51) Int. Cl.
*F01N 3/00* (2006.01)
*F01N 3/28* (2006.01)
(Continued)

(52) U.S. Cl.
CPC ....... *F01N 3/2885* (2013.01); *B01D 53/9477* (2013.01); *F01N 3/035* (2013.01);
(Continued)

(58) Field of Classification Search
CPC .................. F01N 2340/00; F01N 2470/20
(Continued)

(56) References Cited

U.S. PATENT DOCUMENTS 6,125,629 A * 10/2000 Patchett .................. 60/286
6,620,391 B2 * 9/2003 Muller et al. ............ 423/210
(Continued)

FOREIGN PATENT DOCUMENTS

DE 33 37 902 A1 5/1985
DE 10123359 A1 * 11/2002
(Continued)

OTHER PUBLICATIONS

International Search Report of PCT/EP2009/058071, Dated Dec. 30, 2009.
(Continued)

*Primary Examiner* — Mark Laurenzi
*Assistant Examiner* — Anthony Ayala Delgado
(74) *Attorney, Agent, or Firm* — Laurence A. Greenberg; Werner H. Stemer; Ralph E. Locher

(57) ABSTRACT

An exhaust gas purification system for diesel engines of utility motor vehicles, includes an oxidation catalytic converter disposed in an exhaust tract, a reducing agent dosing device having a reducing agent injection device, a reducing agent decomposition device, a soot particle separator, a reduction catalytic converter and a muffler for the exhaust gases. The oxidation catalytic converter is disposed within a minimum distance directly downstream of outlet valves of the engine and a maximum distance of 0.75 m from an exhaust collecting pipe or an outlet of a turbocharger. The reducing agent decomposition device, the soot particle separator and the reduction catalytic converter are disposed separately from the oxidation catalytic converter.

19 Claims, 3 Drawing Sheets

(51) Int. Cl.
*B01D 53/94* (2006.01)
*F01N 3/033* (2006.01)
*F01N 3/035* (2006.01)
*F01N 3/10* (2006.01)
*F01N 3/20* (2006.01)
*F01N 13/14* (2010.01)

(52) U.S. Cl.
CPC ........... *F01N 3/0335* (2013.01); *F01N 3/103* (2013.01); *F01N 3/2066* (2013.01); *F01N 13/14* (2013.01); *B01D 2251/2062* (2013.01); *B01D 2255/91* (2013.01); *B01D 2257/404* (2013.01); *B01D 2257/702* (2013.01); *B01D 2258/012* (2013.01); *F01N 2240/16* (2013.01); *F01N 2240/20* (2013.01); *F01N 2240/40* (2013.01); *F01N 2340/00* (2013.01); *F01N 2470/20* (2013.01); *F01N 2610/02* (2013.01); *F01N 2610/102* (2013.01); *Y02T 10/24* (2013.01)

(58) Field of Classification Search
USPC .......................................... 60/280, 286, 295
See application file for complete search history.

(56) References Cited

U.S. PATENT DOCUMENTS

| | | | |
|---|---|---|---|
| 6,807,807 B2 * | 10/2004 | Kagenishi | 60/288 |
| 6,990,804 B2 * | 1/2006 | Jacob et al. | 60/299 |
| 7,055,314 B2 * | 6/2006 | Treiber | 60/297 |
| 7,210,288 B2 | 5/2007 | Bandl-Konrad et al. | |
| 7,340,888 B2 * | 3/2008 | Zhang et al. | 60/297 |
| 7,628,008 B2 | 12/2009 | Ranalli | |
| 7,763,222 B2 | 7/2010 | Miyairi et al. | |
| 7,788,907 B2 * | 9/2010 | Koehler et al. | 60/286 |
| 7,814,747 B2 | 10/2010 | Bandl-Konrad et al. | |
| 2002/0023435 A1 * | 2/2002 | Woerner et al. | 60/297 |
| 2003/0110763 A1 * | 6/2003 | Pawson et al. | 60/286 |
| 2005/0044844 A1 * | 3/2005 | Berriman et al. | 60/286 |
| 2005/0232830 A1 * | 10/2005 | Bruck | 422/180 |
| 2006/0153761 A1 | 7/2006 | Bandl-Konrad et al. | |
| 2006/0196169 A1 | 9/2006 | Ripper et al. | |
| 2006/0266022 A1 * | 11/2006 | Woerner et al. | 60/295 |
| 2007/0028603 A1 | 2/2007 | Igarashi | |
| 2007/0044460 A1 * | 3/2007 | Gonze et al. | 60/297 |
| 2007/0089401 A1 * | 4/2007 | Nieuwstadt et al. | 60/285 |
| 2007/0101704 A1 * | 5/2007 | Goulette et al. | 60/295 |
| 2007/0137188 A1 * | 6/2007 | Ohya et al. | 60/311 |
| 2007/0175204 A1 | 8/2007 | Shirai et al. | |
| 2007/0175208 A1 | 8/2007 | Bandl-Konrad et al. | |
| 2007/0234713 A1 * | 10/2007 | Blaisdell et al. | 60/299 |
| 2007/0243120 A1 | 10/2007 | Sato | |
| 2007/0261393 A1 * | 11/2007 | Stiebinger | 60/286 |
| 2008/0022670 A1 * | 1/2008 | Ichikawa | 60/299 |
| 2008/0034739 A1 | 2/2008 | Ranalli | |
| 2008/0041036 A1 | 2/2008 | Witte-Merl | |
| 2008/0127635 A1 * | 6/2008 | Hirata et al. | 60/286 |
| 2009/0007551 A1 | 1/2009 | Wahlstrom et al. | |
| 2009/0019831 A1 * | 1/2009 | Heibel et al. | 60/274 |
| 2009/0034364 A1 * | 2/2009 | Terentiev | 366/289 |
| 2011/0005204 A1 | 1/2011 | Bandl-Konrad et al. | |

FOREIGN PATENT DOCUMENTS

| | | | |
|---|---|---|---|
| DE | 103 37 901 A1 | | 3/2005 |
| DE | 102006051788 | * | 5/2008 |
| EP | 1435439 A1 | * | 7/2004 |
| EP | 1 669 563 A1 | | 6/2006 |
| EP | 1712753 A2 | * | 10/2006 |
| JP | 2005226528 A | | 8/2005 |
| JP | 2006057578 A | | 3/2006 |
| JP | 2006183507 A | * | 7/2006 |
| JP | 2007285295 A | | 11/2007 |
| JP | 2008031955 A | | 2/2008 |
| JP | 2008045559 A | | 2/2008 |
| WO | 2004/029423 A1 | | 4/2004 |
| WO | 2004/061278 A1 | | 7/2004 |
| WO | 2006029808 A1 | | 3/2006 |
| WO | 2007086781 A1 | | 8/2007 |

OTHER PUBLICATIONS

W. Maus: "Abgasnachbehandlung im Spannungsfeld von Politik and Technik" Motortechnishe Zeitschrit MTZ Jun. 30, 2008 (Jun. 30, 2008), pp. 487-492, XP002545439.

* cited by examiner

EXHAUST GAS PURIFICATION SYSTEM FOR DIESEL ENGINES OF UTILITY MOTOR VEHICLES

CROSS-REFERENCE TO RELATED APPLICATION

This is a continuation, under 35 U.S.C. §120, of copending International Application No. PCT/EP2009/058071, filed Jun. 26, 2009, which designated the United States; this application also claims the priority, under 35 U.S.C. §119, of German Patent Application No. DE 10 2008 035 562.3, filed Jul. 30, 2008; the prior applications are herewith incorporated by reference in their entirety.

BACKGROUND OF THE INVENTION

Field of the Invention

The invention relates to an exhaust-gas purification system for diesel engines of utility motor vehicles, including an oxidation catalytic converter disposed in an exhaust tract, a reducing agent dosing device with a reducing agent injection device, a reducing agent decomposition device, a soot particle separator, a reduction catalytic converter and a muffler.

In the field of the exhaust-gas treatment of mobile internal combustion engines, it has proven to be particularly expedient to use catalytic converters and soot particle separators constructed as honeycomb bodies, which have structured substrate or carrier elements (in particular metallic sheet-metal foils, wire nonwovens, etc. or ceramic plates, extrudates . . . ) which form channels, in which it is possible for the structures of the substrate or carrier elements to be provided with microstructures that form openings and flow-guiding surfaces which are aligned so as to conduct partial flows of the exhaust gases along the substrate or carrier elements from the inside to the outside and/or vice versa.

Different processes are used for the conversion of the harmful constituents of the exhaust gas of diesel engines. For example, for the reduction of soot, the so-called "CRT" process is used, in which a conversion of soot is motivated even at low temperatures through the use of nitrogen oxide generated in the exhaust gas. It is likewise possible for the so-called SCR process to be used, in which the nitrogen oxides contained in the exhaust gas are reduced through the use of a reducing agent (urea, ammonia . . . ). Combinations of those methods have also already been proposed. For that purpose, it is necessary for catalytic converters to be disposed in the exhaust system, wherein specifically in utility motor vehicles space problems can arise when integrating relatively large-volume converters, due to the amount of exhaust gas being produced.

It emerges therefrom that the described exhaust-gas purification systems still have room for improvement in order to improve thermal response behavior (for example after a cold start) and to obtain the highest possible exhaust-gas purification rate over a long period of time. Furthermore, it is sought to adapt the exhaust-gas purification system for diesel engines of utility motor vehicles to the given spatial conditions, taking into consideration the need to provide a large-volume exhaust muffler in order to meet relevant legal regulations.

SUMMARY OF THE INVENTION

It is accordingly an object of the invention to provide an exhaust gas purification system for diesel engines of utility motor vehicles, which overcomes the hereinafore-mentioned disadvantages and at least partially solves the highlighted problems of the heretofore-known systems of this general type. In particular, it is sought to specify parameters and construction details of an exhaust-gas purification system for diesel engines of utility motor vehicles with which it is possible to realize an efficient exhaust-gas purification configuration having a simple and inexpensive construction and permitting a space-saving configuration.

With the foregoing and other objects in view there is provided, in accordance with the invention, an exhaust-gas purification system for diesel engines having outlet valves, in utility motor vehicles. The system comprises an exhaust tract, an oxidation catalytic converter disposed in the exhaust tract, a reducing agent dosing device having a reducing agent injection device, a reducing agent decomposition device, a soot particle separator, a reduction catalytic converter, an exhaust muffler, an exhaust-gas turbocharger having an outlet or an exhaust-gas collecting pipe, the oxidation catalytic converter disposed between a minimum distance directly downstream of the outlet valves of the engine and a maximum distance of 0.75 m, preferably less than 0.5 m, from the exhaust-gas collecting pipe or the outlet of the exhaust-gas turbocharger, and the reducing agent decomposition device, the soot particle separator and the reduction catalytic converter being disposed separately from the oxidation catalytic converter. An exhaust-gas collecting pipe is to be understood to mean the manifold or connection between the cylinder outlets of the diesel engine to form an exhaust-gas pipe.

The shorter the above-mentioned distance is, the hotter the exhaust gases are entering into the oxidation catalytic converter, so that the conversion of the pollutants contained in the exhaust gases takes place virtually immediately after the start of the engine. With the configuration and the construction of the elements of the exhaust-gas purification system according to the invention, conversion of the pollutants is obtained with at least 98% effectiveness after only a few seconds.

The oxidation catalytic converter is placed most expediently when it is split up and disposed directly downstream of the outlet valves of each cylinder of the engine. Since this is not always possible for structural reasons and it is also the aim for the exhaust-gas purification system according to the invention to be used as a retrofittable system for existing diesel engines, a configuration with a maximum distance of 0.75 m, preferably less than 0.5 m, from an exhaust-gas collecting pipe of a diesel engine without an exhaust-gas turbocharger or from an exhaust turbine outlet of a diesel engine with an exhaust-gas turbocharger is also advantageous, in particular if a thermal insulation is provided for a pipe connection from the exhaust-gas collecting pipe or from the exhaust-gas turbine outlet to the oxidation catalytic converter and/or from the oxidation catalytic converter to the exhaust muffler.

In any case, for a construction adapted to the spatial conditions of a utility vehicle, it is important for the oxidation catalytic converter to be disposed separately from the other elements of the exhaust-gas purification system, the reducing agent dosing device, the reducing agent injection device, the reducing agent decomposition device, the soot particle separator, the reduction catalytic converter and the muffler.

The oxidation catalytic converter serves to oxidize unburned hydrocarbons and carbon monoxide contained in the exhaust gas to form water and carbon dioxide, and to oxidize nitrogen oxides contained in the exhaust gas to form $NO_2$.

A reducing agent is introduced by a reducing agent dosing device through a reducing agent injection device into the exhaust gases, with primarily urea being injected as the reducing agent and with the urea decomposing in the reducing agent decomposition device to form ammonia. In this case, the reducing agent injection device may be positioned in the direct vicinity (in this case preferably downstream) of the oxidation catalytic converter or (upstream) of the reducing agent decomposition device.

In the soot particle separator, the soot particles produced in the diesel engine process are filtered out and oxidized to form carbon dioxide. The soot particle separator is preferably constructed as a so-called partial flow filter in which there are no flow dead-ends. It is very particularly preferable for the particle separator to be constructed from metallic foils and metallic wire nonwovens.

The reduction catalytic converter finally serves to reduce the nitrogen oxides to form nitrogen and water vapor through the use of the reducing agent. It is very particularly preferable in this case for a ceramic substrate structure to be used for this purpose.

It is clear that, due to the considerable amount of exhaust gas to be treated, the components mentioned herein may also be provided multiply, in particular with a plurality of configurations adjacent one another (in parallel) and/or one behind the other (in series). Aside from the converters, this also applies, in particular, to the exhaust line and/or reducing agent injection device.

In accordance with another feature of the invention, a thermal insulation is provided for a pipe connection from the exhaust-gas collecting pipe or from the exhaust-gas turbine outlet to the oxidation catalytic converter and/or from the oxidation catalytic converter to the exhaust muffler in order to avoid heat losses in the exhaust line. A thermal insulation device is, for example, an external encasement or an internal lining of an exhaust pipe with thermally insulating material, which is composed, for example, of a material which is a poor heat conductor, for example mineral wool, and which considerably reduces a transfer of heat from the exhaust gases to the exhaust pipe.

In accordance with a further feature of the invention concerning this measure, it is proposed that an internal insulation be provided in the region of the reducing agent injection device. Such an internal insulation is composed, preferably, of an inner pipe which is disposed at a distance apart from the exhaust pipe, wherein the inner pipe may also be provided, for example, with outwardly embossed nodules, bumps or knobs as spacers.

In order to bring the inner pipe up to an elevated temperature quickly through the use of the exhaust gases after a cold start, the inner pipe has a low surface-specific heat capacity in that it is formed with a wall thickness of only 0.3 to 0.5 mm.

In accordance with an added feature of the invention, if the distance of the reducing agent injection device from the engine is relatively large for structural reasons, in such a way that the heating by the exhaust gases after a cold start takes place only after a time delay, it is possible for an (activatable, controllable) heating device to be provided (for example in the region of the internal insulation). The heating device may preferably be constructed as an electric heating device. The electric heating device may be automatically switched on in the event of a cold start and/or addition of reducing agent, and if appropriate switched off automatically when a predefined temperature is reached. The heating device may preferably be composed of a coil of a heating resistor, but it is also possible for the heating action to be obtained by the injection of fuel and the subsequent combustion thereof.

In accordance with an additional, particularly preferred, feature of the invention the oxidation catalytic converter and/or the reducing agent decomposition device and/or the soot particle separator and/or the reducing agent catalytic converter have structured substrate or carrier elements which form channels. The structures of the substrate or carrier elements may be provided with microstructures which form openings and flow-guiding surfaces that are aligned so as to conduct partial flows of the exhaust gases along the substrate or carrier elements from the inside to the outside and/or vice versa. In this way, a homogenization of the flow speed over the cross section of the above-mentioned components, a thorough mixture of the partial flows, and a separation of laminar flows is obtained, as a result of which the effectiveness of the elements of the exhaust-gas purification system is considerably increased.

In accordance with yet another feature of the invention, an expedient configuration and coordinated effectiveness of the individual elements of the exhaust-gas purification system according to the invention is obtained if the cross section of the oxidation catalytic converter amounts to 30 to 80%, preferably 50 to 70% of the cross section of the soot particle separator and/or of the reducing agent catalytic converter. Furthermore, it may be expedient for the cell density, that is to say the number of channels per square centimeter, to lie between 15 and 60, preferably between 30 and 45 in the oxidation catalytic converter and between 30 and 90, preferably between 45 and 60 in the reduction catalytic converter. The cross section of the oxidation catalytic converter, of the soot particle separator and of the reduction catalytic converter is the cross section of the housing in which the substrate elements of the catalytic converters are disposed. The cell density defines the number of channels per $cm^2$ in relation to the catalytic converter cross-sectional area.

In accordance with yet a further feature of the invention, the conversion of the nitrogen oxides in the reducing agent catalytic converter through the use of the reducing agent may be increased further if the reduction catalytic converter is composed of a first part with a high-temperature catalyst coating and a downstream second part with a low-temperature catalyst coating. In this case, the reduction catalytic converter is divided physically into a first part and a second part. This division can be avoided if the reduction catalytic converter has zone coating with high-temperature and low-temperature catalysts on common substrate or carrier elements. A high-temperature catalyst coating and a low-temperature catalyst coating are to be understood to mean coatings which are particularly active at respective high temperatures and low temperatures. Zone coating is provided if the substrate or carrier elements in a catalytic converter housing are coated differently either in the main flow direction or transversely with respect to the main flow direction.

In accordance with yet an added feature of the invention, a spatially expedient configuration can be obtained if the reducing agent decomposition device and/or the reduction catalytic converter are combined to form a unit with the soot particle separator through the at least partial coating of the soot particle separator with a hydrolysis catalyst and/or with a reduction catalyst. That unit can advantageously be integrated into the exhaust muffler. The combining of elements of the exhaust-gas purification system to form a unit is to be understood to mean that those elements are disposed in a common housing. A hydrolysis catalyst effects the decomposition of the urea, which is used as a reducing agent, into ammonia and water vapor. Substrate or carrier elements of the reduction catalytic converter are coated with a reduction catalyst, which effects the reduction of the nitrogen oxides, through the use of ammonia, into nitrogen and water vapor.

In accordance with yet an additional feature of the invention, a further integrated structural unit can be realized if the reducing agent injection device, the reducing agent decomposition device, the soot particle separator and the reduction catalytic converter are disposed in the exhaust muffler, assuming that the resulting increase in volume of the exhaust muffler can be accommodated on or in the utility motor vehicle.

In accordance with again another feature of the invention, in order to increase catalytic effectiveness, a washcoat may be applied as a coating to the catalyst carrier or substrate in the oxidation catalytic converter and/or in the reducing agent decomposition device and/or in the soot particle separator and/or in the reduction catalytic converter. The washcoat, through the use of its structure, enlarges the surface area and may contain additional substances which increase the activity of the catalytic converters, with it being possible for a quantity of 10 to 60 g/l catalytic converter volume, preferably 25 to 40 g/l catalytic converter volume, to be provided for the washcoat coating. A washcoat coating is a porous oxide layer, preferably aluminum oxide, which is applied to the monolithic catalyst carrier or substrate. The washcoat, through the use of its structure, enlarges the surface area. The washcoat is coated with the catalytically active substances and, to increase the catalytic effectiveness, contains additional substances, so-called promoters, which increase the activity of the catalysts.

The location at which the reducing agent is introduced into the exhaust gas lies preferably upstream of the soot particle separator, and always downstream of the oxidation catalytic converter, in the flow direction.

If the elements of the exhaust-gas purification system other than the oxidation catalytic converter are integrated in the exhaust muffler, the reducing agent can be injected directly into the exhaust muffler, preferably approximately coaxially with respect to a central axis of the soot particle filter (which is advantageously (partially) coated with a hydrolysis catalyst).

In accordance with a concomitant feature of the invention, alternatively and/or in combination therewith, it is also possible for the reducing agent to be injected into the exhaust pipe upstream of the exhaust muffler. In this case, it is preferable for the injection to be carried out in such a way that the reducing agent impinges on a rear side of the substrate for the oxidation catalytic converter counter to a flow direction of the exhaust gas. If the reducing agent injection device is disposed downstream and in the direct vicinity of the oxidation catalytic converter, it is proposed that the reducing agent injection device discharge the reducing agent onto the carrier or substrate of the oxidation catalytic converter, that is to say counter to the flow direction of the exhaust gas. That part of the substrate or carrier may then, for example, have a catalytically inactive construction or be formed with a reducing agent decomposition coating. The decomposition or evaporation of the reducing agent in the hotter part of the exhaust system can thus be obtained quickly, and a thorough mixture with the exhaust gas is ensured even over the long common flow path to the reducing agent decomposition device in the exhaust muffler.

Other features which are considered as characteristic for the invention are set forth in the appended claims, noting that the features specified individually in the dependent claims may be combined with one another in any desired technologically meaningful way and define further embodiments of the invention.

Although the invention is illustrated and described herein as embodied in an exhaust gas purification system for diesel engines of utility motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
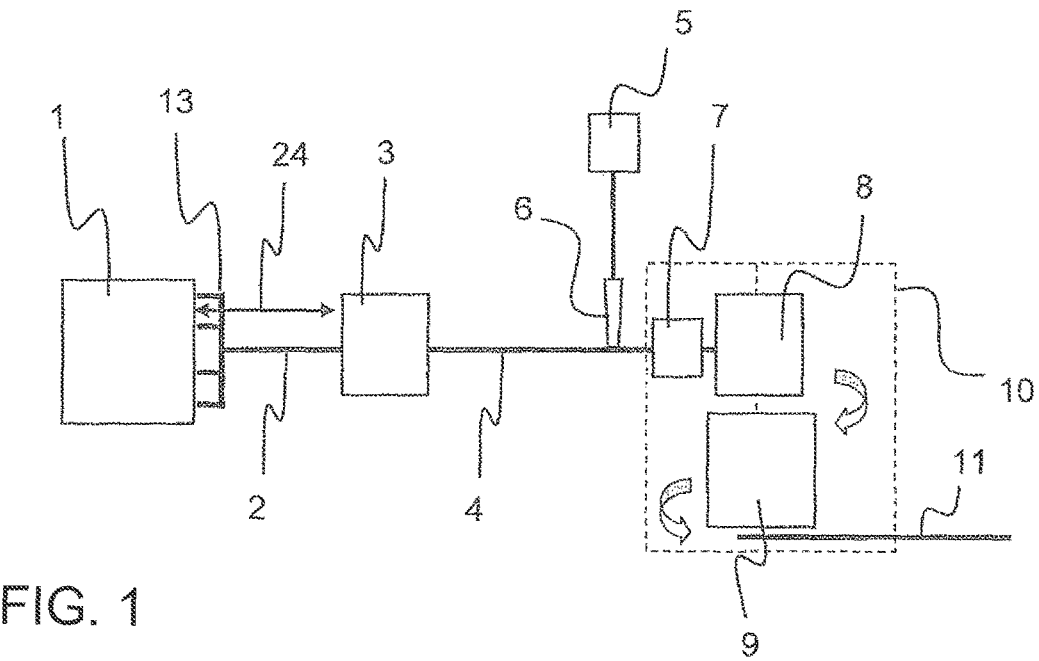
FIG. 1 is a block diagram showing a first embodiment of an exhaust-gas purification system according to the invention.
Figure 2:
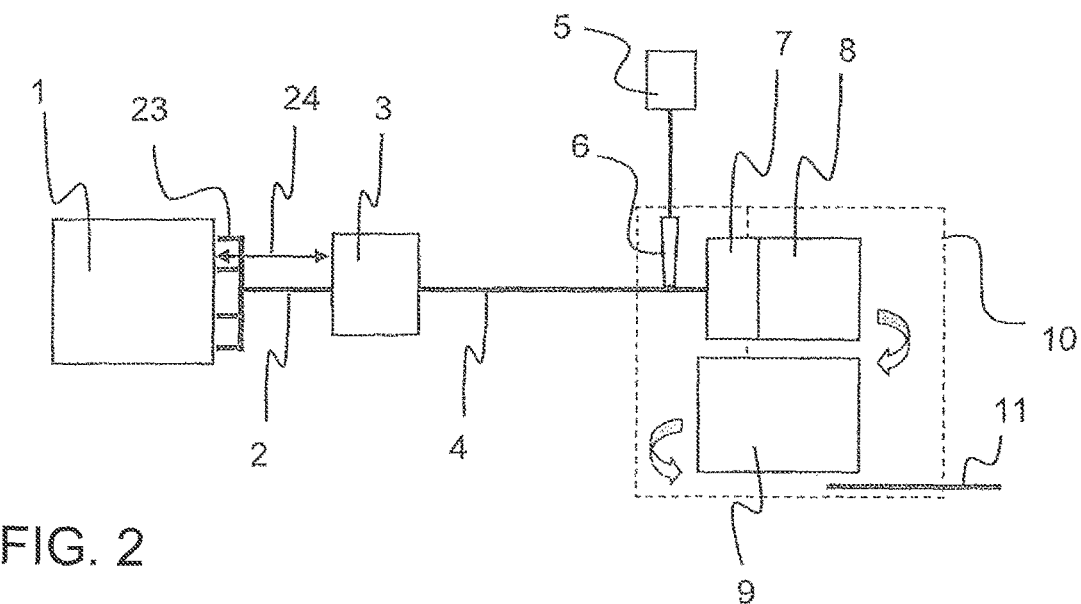
FIG. 2 is a block diagram showing a structural variant of the exhaust-gas purification system according to FIG. 1.
Figure 3:
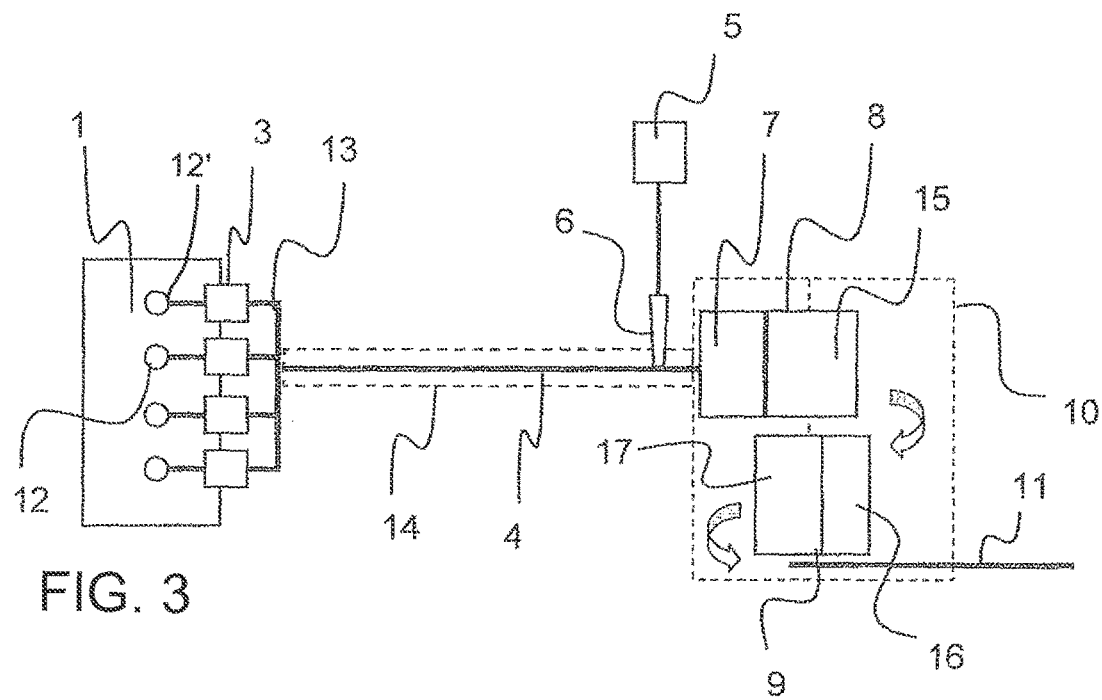
FIG. 3 is a block diagram showing a further structural variant of the exhaust-gas purification system according to the invention.

Referring now in detail to the figures of the drawing for explaining the invention and the technical field in more detail by showing particularly preferred structural variants to which the invention is not restricted, and first, particularly, to FIGS. 1-3 thereof, there is seen an exhaust-gas purification system which is constructed for diesel engines of utility motor vehicles, in particular for trucks, busses as well as watercraft and aircraft. The power demand on utility motor vehicles of this size is high, while fuel consumption should at the same time be minimized. Accordingly, the swept volume of such diesel engines for utility motor vehicles varies in a range between, for example, 6 and 12 liters or even higher. These diesel engines are generally provided with an exhaust-gas turbocharger to increase power and lower the specific fuel consumption. An exhaust-gas turbocharger is to be understood to mean the combination of an exhaust-gas turbine, which is acted on by exhaust gases of the diesel engine, with a turbocompressor which is driven by the exhaust-gas turbine. The turbocompressor serves to compress the intake air of the diesel engine to an elevated charge pressure, as a result of which a greater mass of air passes into the engine and is available for the combustion of a greater amount of fuel.

The fuel combustion in the individual cylinders of a diesel engine produces primarily carbon dioxide and water vapor, but the combustion is incomplete, so that unburned hydrocarbon compounds, carbon dioxide, soot and, due to the high temperatures, nitrogen oxides are present in the exhaust gases, and they must be removed from the exhaust gases to the greatest possible extent through the use of the exhaust-gas purification system according to the invention.

A diesel engine 1 according to FIG. 1 does not have an exhaust-gas turbocharger, but the exhaust gases pass through an exhaust-gas collecting pipe or manifold 13, which is connected to each cylinder, into a first exhaust pipe or pipe connection 2 and from there into an oxidation catalytic converter 3. A distance 24, indicated by a double arrow, between the exhaust-gas collecting pipe 13 and the oxidation catalytic converter 3 is at most 0.7 m, preferably less than 0.5 m, in order to ensure that the exhaust gases emerging from the exhaust-gas collecting pipe 13 pass into the oxidation catalytic converter 3 at the highest possible temperature. In the oxidation catalytic converter 3, the unburned gaseous constituents of the exhaust gases are oxidized to form water vapor and carbon dioxide. Furthermore, as high as possible a proportion of the nitrogen oxides in the exhaust gases is oxidized to form nitrogen dioxide ($NO_2$).

The exhaust gases pass from the oxidation catalytic converter 3, through a second exhaust pipe or pipe connection 4, into a muffler 10. In the present case, a muffler is to be understood to mean a housing for the exhaust gas. A multiplicity of substrate bodies is disposed in the housing, and the exhaust gas is deflected multiple times in the housing in a "relatively free-flowing" manner (see also the arrows in the figures). In the exemplary embodiment according to FIG. 1, a reducing agent, preferably urea, is injected into the exhaust pipe 4 by a reducing agent dosing device 5 through a reducing agent injection device 6, and passes together with the exhaust gases into a reducing agent decomposition device 7 which is disposed in the muffler 10 and in which the urea is catalytically converted into water vapor and ammonia ($NH_3$). In the muffler 10, a soot particle separator 8 is positioned downstream of the reducing agent decomposition device 7. As high as possible a proportion of the soot particles contained in the exhaust gas are trapped and burned in the soot particle separator 8. The exhaust gases pass from the soot particle separator 8 through a line into a reduction catalytic converter 9 in which the nitrogen oxides are reduced catalytically to form nitrogen and water vapor. If appropriate, another non-illustrated trapping device for excess ammonia may be positioned downstream of the reduction catalytic converter 9. The exhaust gases emerging from the reduction catalytic converter 9 and entering into the interior of the muffler 10 leave the muffler 10 in sound-deadened fashion through an exhaust tailpipe 11.

The embodiment according to FIG. 2 differs from that according to FIG. 1 in that the diesel engine 1 is provided with an exhaust-gas turbocharger 23, and accordingly, a distance 24 of a maximum of 0.75 m, preferably of less than 0.5 m, is provided between an exhaust-gas turbine outlet and the oxidation catalytic converter 3. Furthermore, the reducing agent injection device 6 is disposed within the muffler 10 and the reducing agent decomposition device 7 is integrated into the soot particle separator 8. In this way, a compact construction of the muffler 10 is obtained.

The embodiment according to FIG. 3 has a diesel engine 1 with separately illustrated cylinders 12. Oxidation catalytic converters 3 are disposed directly downstream of outlet valves 12' in each outlet line of each cylinder 12. This construction is possible if the diesel engine 1 is structurally provided for the configuration of oxidation catalytic converters 3 in the outlet lines. The exhaust gases emerging from the individual oxidation catalytic converters 3 pass into an exhaust-gas collecting pipe 13, so that in this case the smallest possible distance between the oxidation catalytic converters 3 and the exhaust gases emerging from the engine is provided. The oxidation catalytic converters 3 respond correspondingly quickly, in an efficient way, after a cold start of the diesel engine 1. The exhaust gases pass from the exhaust-gas collecting pipe 13 through an exhaust pipe 4, which is provided with a thermal insulation 14, into the muffler 10 and from there into the soot particle filter 8 with the reducing agent decomposition device 7 integrated therein. The reducing agent injection device 6 is constructed so as to inject the reducing agent substantially coaxially with respect to a central axis 15 of the soot particle separator 8.

In this case, the reducing agent catalytic converter 9 has a first part 16, which is provided with a high-temperature catalyst coating, and a second part 17, which is provided with a low-temperature catalyst coating. The effectiveness of the reduction catalytic converter 9 is additionally increased in this way. In the illustrated exemplary embodiment, the reduction catalytic converter is composed of two physically distinct parts 16, 17, although it is also possible to provide zone coating with a high-temperature catalyst and a low-temperature catalyst on common substrate elements.

Figure 4:
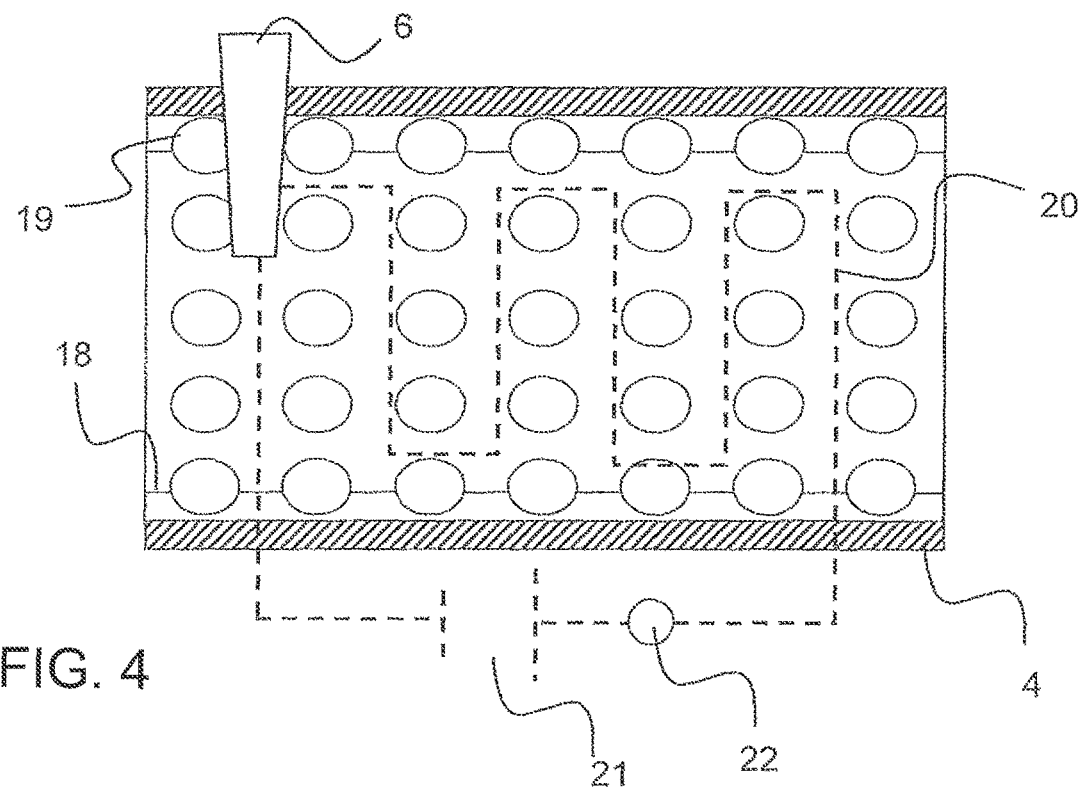
FIG. 4 is a partial longitudinal-sectional view of an exhaust pipe provided with an internal insulation.

The thermal insulations 14 of the exhaust pipes 2 and 4 may be composed of thermally insulating material such as mineral wool or the like, as external insulation. An internal insulation in the form of an inner pipe 18 disposed at a distance from the exhaust pipe 4, is preferably provided in the region of the reducing agent injection device 6, as seen in FIG. 4. The inner pipe 18 is provided with outwardly embossed knobs, nodules or bumps 19 as spacers, as a result of which a thermally insulating gas layer, which exhibits little movement, is formed between the inner pipe 18 and the exhaust pipe 4. A heating device 20 may be disposed in the inner pipe 18. The heating device 20 in the illustrated exemplary embodiment is constructed as an electric heating resistor which provides a heating action selectively through the use of a battery 21 and a switch 22. The heating action is activated in a manner which is controlled by a non-illustrated engine controller, and is deactivated again when a predefined exhaust-gas temperature is reached. In this way, it is possible, in particular, to prevent injected reducing agent from condensing (again) and/or accumulating as solid matter on the relatively cold wall of the exhaust pipe.

Figure 5:
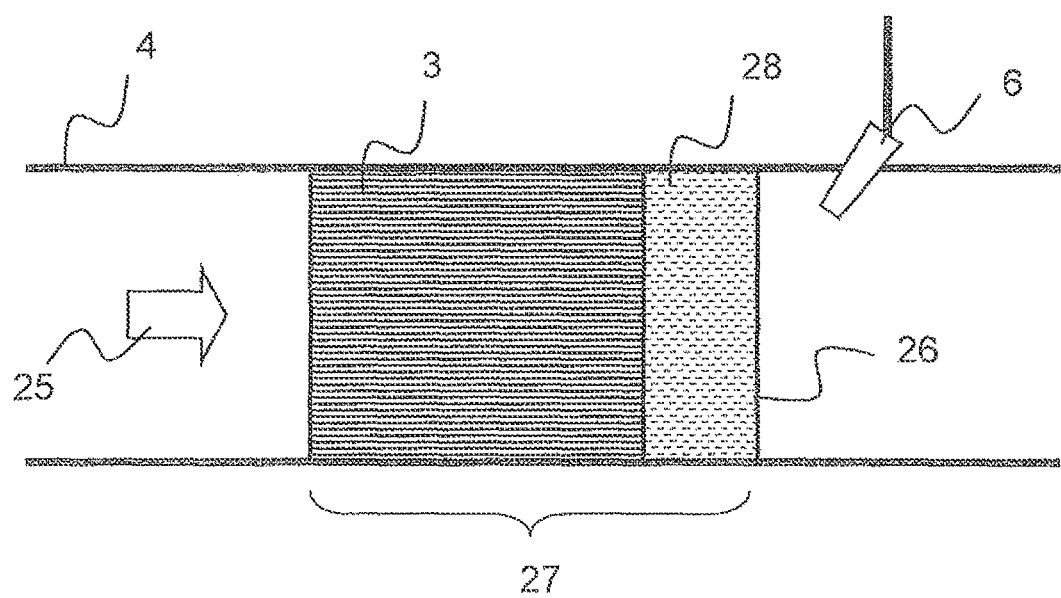
FIG. 5 is a fragmentary, longitudinal-sectional view of an oxidation catalytic converter with reducing agent metering at a rear side.

FIG. 5 shows an installation situation which is provided if the reducing agent is (if appropriate additionally) injected through a reducing agent injection device 6 into the exhaust pipe 4 upstream of a non-illustrated exhaust muffler, in such a way as to impinge on a rear side 26 of a substrate or catalyst carrier 27 of the oxidation catalytic converter 3 counter to a flow direction 25 of the exhaust gas. The substrate or catalyst carrier 27, for example a ceramic or metallic honeycomb structure, may have a zone 28 in a rear region adjacent the rear side 26. The zone 28 promotes the conversion or evaporation of the reducing agent on/in the substrate or catalyst carrier 27. The zone 28 may be formed for this purpose without a coating or with some other coating as in the region of the oxidation catalytic converter 3. It is preferable for the zone 28 to be formed in one piece with the substrate of the oxidation catalytic converter 3, although this is not imperatively necessary.

The present invention is not restricted to the illustrated exemplary embodiments. Numerous modifications of the invention are rather also possible within the scope of the claims.

The invention claimed is:

1. An exhaust-gas purification system for diesel engines having outlet valves, in utility motor vehicles, the system comprising:

an exhaust tract;

an oxidation catalytic converter disposed in said exhaust tract;

a reducing agent dosing device associated with said exhaust tract and having a reducing agent injection device;

a reducing agent decomposition device associated with said exhaust tract;

a soot particle separator associated with said exhaust tract;

a reduction catalytic converter associated with said exhaust tract;

an exhaust muffler associated with said exhaust tract;

an exhaust-gas turbocharger having an outlet or an exhaust-gas collecting pipe, associated with said exhaust tract and disposed between the outlet valves of the engine and said oxidation catalytic converter;

said oxidation catalytic converter disposed between a minimum distance directly downstream of the outlet valves of the engine and a maximum distance of 0.75 m from said exhaust-gas collecting pipe or said outlet of said exhaust-gas turbocharger; and said reducing agent decomposition device, said soot particle separator and said reduction catalytic converter being integrated into said exhaust muffler and being disposed separately from said oxidation catalytic converter and downstream of said reducing agent dosing device.

2. The exhaust-gas purification system according to claim 1, which further comprises a pipe connection connected from said exhaust-gas collecting pipe or from said outlet of said exhaust-gas turbocharger to said oxidation catalytic converter, and at least one thermal insulation disposed at said pipe connection.

3. The exhaust-gas purification system according to claim 1, which further comprises a pipe connection connected from said oxidation catalytic converter to said exhaust muffler, and at least one thermal insulation disposed at said pipe connection.

4. The exhaust-gas purification system according to claim 1, which further comprises a pipe connection connected from said exhaust-gas collecting pipe or from said outlet of said exhaust-gas turbocharger to said oxidation catalytic converter and from said oxidation catalytic converter to said exhaust muffler, and at least one thermal insulation disposed at said pipe connection.

5. The exhaust-gas purification system according to claim 1, which further comprises an internal insulation within said exhaust tract in vicinity of said reducing agent injection device.

6. The exhaust-gas purification system according to claim 2, which further comprises an internal insulation within said pipe connection in vicinity of said reducing agent injection device.

7. The exhaust-gas purification system according to claim 3, which further comprises an internal insulation within said pipe connection in vicinity of said reducing agent injection device.

8. The exhaust-gas purification system according to claim 4, which further comprises an internal insulation within said pipe connection in vicinity of said reducing agent injection device.

9. The exhaust-gas purification system according to claim 5, wherein said internal insulation is an inner pipe disposed at a distance from and concentrically to said exhaust tract.

10. The exhaust-gas purification system according to claim 6, wherein said internal insulation is an inner pipe disposed at a distance from and concentrically to said pipe connection.

11. The exhaust-gas purification system according to claim 7, wherein said internal insulation is an inner pipe disposed at a distance from and concentrically to said pipe connection.

12. The exhaust-gas purification system according to claim 8, wherein said internal insulation is an inner pipe disposed at a distance from and concentrically to said pipe connection.

13. The exhaust-gas purification system according to claim 1, which further comprises an active heating device.

14. The exhaust-gas purification system according to claim 1, wherein said oxidation catalytic converter has a cross section amounting to 30 to 80% of a cross section of at least one of said soot particle separator or said reducing agent catalytic converter.

15. The exhaust-gas purification system according to claim 1, wherein said oxidation catalytic converter has a cross section amounting to 50 to 70% of a cross section of at least one of said soot particle separator or said reducing agent catalytic converter.

16. The exhaust-gas purification system according to claim 1, wherein said reduction catalytic converter includes a first part with a high-temperature catalyst coating and a second part with a low-temperature catalyst coating.

17. The exhaust-gas purification system according to claim 1, wherein at least one of said reducing agent decomposition device or said reduction catalytic converter is combined with said soot particle separator to form a unit, and said soot particle separator has elements at least partially coated with at least one of a hydrolysis catalyst or a reduction catalyst.

18. The exhaust-gas purification system according to claim 1, wherein at least one of said oxidation catalytic converter, said reducing agent decomposition device, said soot particle separator or said reduction catalytic converter has a catalyst carrier body with a washcoat coating quantity of 10 to 16 g/l of catalytic converter volume.

19. The exhaust-gas purification system according to claim 1, wherein said oxidation catalytic converter has a carrier with a rear side, and the reducing agent is injected into said exhaust tract upstream of said exhaust muffler and impinges on said rear side of said carrier counter to a flow direction of the exhaust gas.

* * * * *